No. 884,179. PATENTED APR. 7, 1908.
J. C. MABBOTT.
PEN FOR HOLDING SWINE.
APPLICATION FILED MAY 2, 1907.
3 SHEETS—SHEET 1.
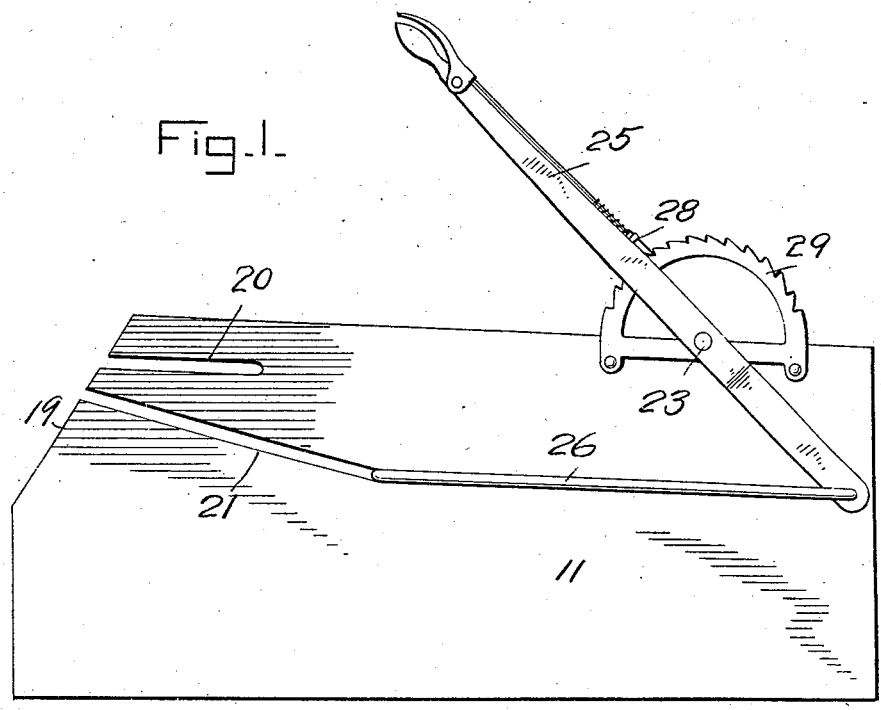
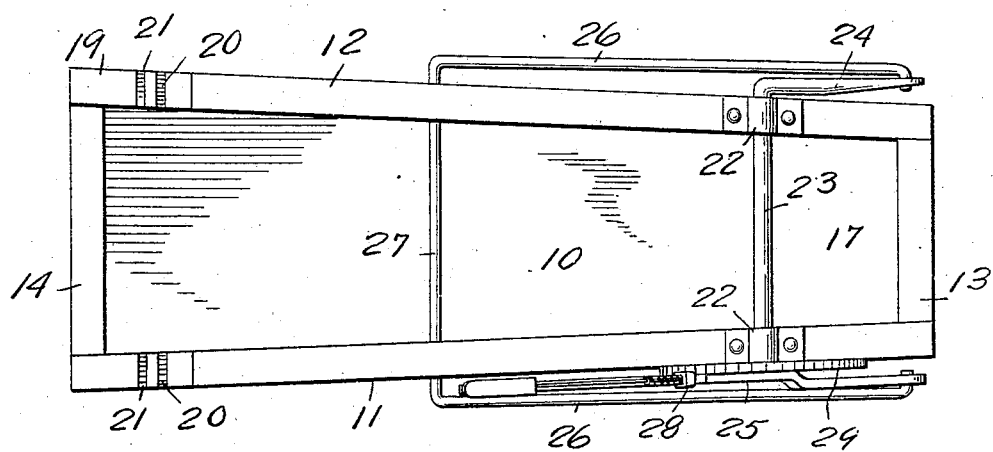
Witnesses
G. R. Thomas
H. G. Smith
Inventor
John C. Mabbott
By Chandler Chandler
Attorneys No. 884,179. PATENTED APR. 7, 1908.
J. C. MABBOTT.
PEN FOR HOLDING SWINE.
APPLICATION FILED MAY 2, 1907.
3 SHEETS—SHEET 2.
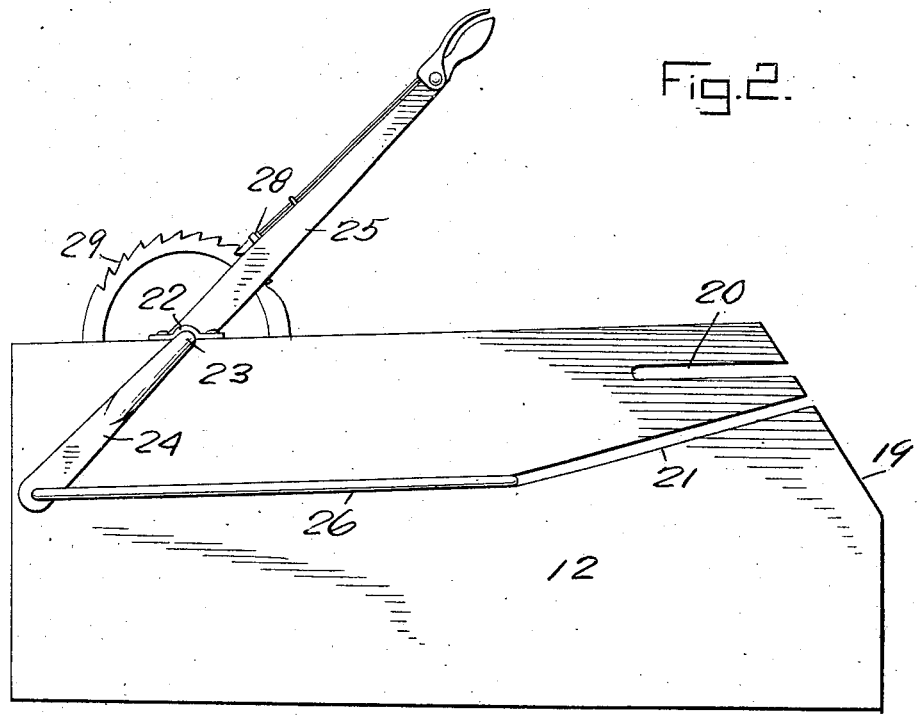
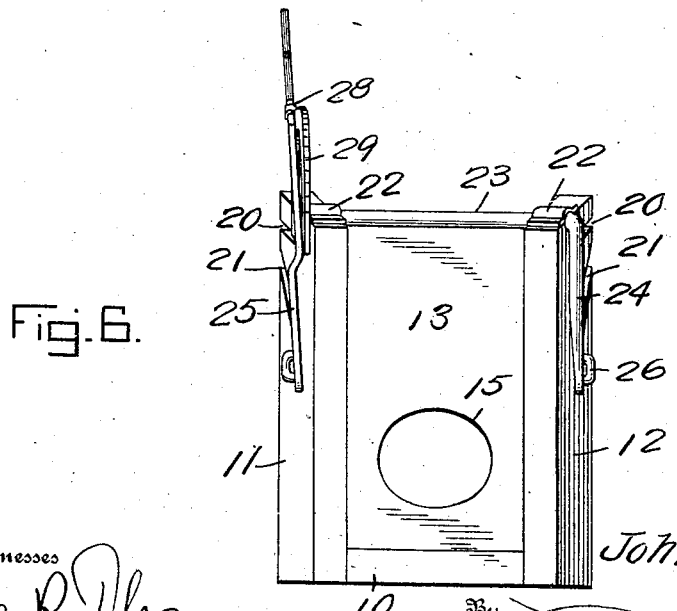
Witnesses
G. R. Thomas
Inventor
John C. Mabbott
By Chandler & Chandler
Attorneys No. 884,179. PATENTED APR. 7, 1908.
J. C. MABBOTT.
PEN FOR HOLDING SWINE.
APPLICATION FILED MAY 2, 1907.

3 SHEETS—SHEET 3.

Witnesses
G. R. Thomas
F. E. Smith

Inventor
John C. Mabbott
By Chandler & Chandler
Attorneys

THE NORRIS PETERS CO., WASHINGTON, D. C.

UNITED STATES PATENT OFFICE.

JOHN C. MABBOTT, OF MOUNT VERNON, SOUTH DAKOTA.

PEN FOR HOLDING SWINE.

No. 884,179.   Specification of Letters Patent.   Patented April 7, 1908.

Application filed May 2, 1907. Serial No. 371,474.

*To all whom it may concern:*

Be it known that I, JOHN C. MABBOTT, a citizen of the United States, residing at Mount Vernon, in the county of Davison, State of South Dakota, have invented certain new and useful Improvements in Pens for Holding Swine; and I do hereby declare the following to be a full, clear, and exact description of the invention, such as will enable others skilled in the art to which it appertains to make and use the same.

This invention relates to pens for holding swine during castrating operations.

Under the present method of tying or holding by hand, the animal is frequently injured owing to laxity of movement during the operation and hence it is the object of my invention to provide a pen of the class described in which the animal may be confined not only in such a manner that no movement is possible but in a most convenient position for the operation.

One of the most desirable features of the device is that the mechanism for holding the animal is adjustable not only to suit swine of different sizes but also to engage, at the will of the operator, different portions of the hind legs of the animal.

Figure 4:
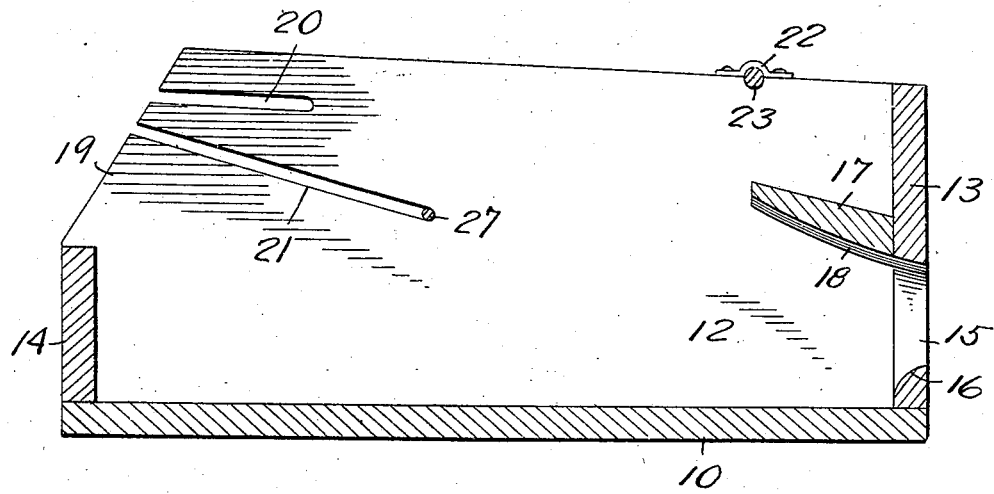
Figure 5:
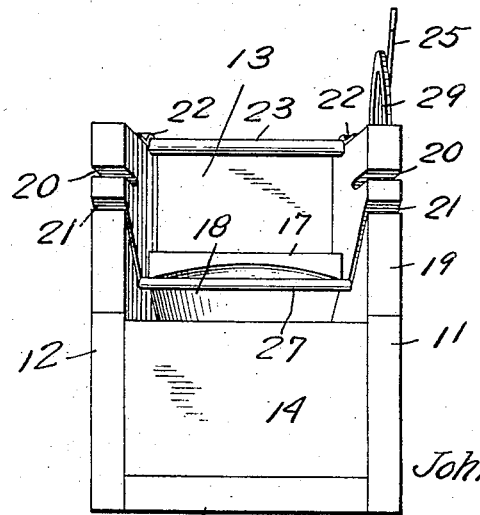

In the accompanying drawings, Figure 1 is a side elevation of the pen, Fig. 2 is a similar view of the opposite side thereof, Fig. 3 is a top plan view of the pen, Fig. 4 is a vertical longitudinal sectional view through the same, Fig. 5 is a rear end view, and, Fig. 6 is a front end view.

As shown in the drawings, the pen comprises a floor 10, sides 11 and 12, a front end 13, and a rear end 14. The sides of the pen converge toward the front end of the same and formed through the said front end is an opening 15 through which the snout of the animal is engaged, the edges of the opening being suitably rounded and smoothed as at 16 so as not to injure the animal's snout. Located within the pen at its forward end and extending from side to side of the same is a throat board 17 which has its under face concaved as at 18 so that the throat of the animal will not be liable to be injured. This board has its forward edge coincident with the upper edge of the opening 15 in the front end of the pen but is inclined upwardly and rearwardly so that when the animal is placed in the pen upon his back and with his snout projecting through the opening 15, his throat will contact with the under side of the throat board, this serving to securely hold his head against movement.

The rear end of the pen is of considerably less height than the sides thereof and the end edges of the said sides are cut at an angle as at 19 above the said end of the pen so as not to interfere with the arms of the operator. For a purpose to be presently made apparent, pairs of slots 20 and 21 are formed in the sides of the pen adjacent the upper end thereof, the slots of each pair being in alinement and the slots 20 being located in a plane above the slots 21 and of less length. Also, the slots 20 extend in a substantially horizontal plane whereas the slots 21 extend in an inclined plane. Mounted in suitable bearings 22 upon the upper edges of the sides of the pen and directly above the rear edge of the throat board is a rock shaft 23 and from one end of the shaft extends a crank arm 24, there being a lever 25 fixed upon the said shaft at its opposite end. The crank arm and the lever extend in a common direction and both substantially vertically, and pivoted to the lower ends of the arm and the shaft are the forward ends of parallel arms 26 which constitute a portion of the holding yoke for the pen, the said yoke being completed by a connecting portion 27 which is interchangeably engaged in the pairs of slots 20 and 21 and consequently extends transversely of the pen. The lever of course extends above the plane of the upper edges of the sides of the pen and is adapted to be rocked to move the holding yoke to different positions and to be held at any point in its rocking movement by means of the ordinary form of pawl 28 which coöperates with a segmental rack 29.

From the foregoing description of my invention it will be understood that where a small animal is to be operated upon, the yoke is engaged in the longer slots 21 and the lever rocked to bring the connecting portion 27 of the yoke into engagement with the hind legs of the animal. This adjustment of the yoke permits of the pen being used to hold animals having very short legs as the connecting portion of the yoke, when engaged in the longer slots, is positioned nearer to the floor of the pen than when engaged in the upper or shorter slots. The yoke, however, is engaged in these latter slots when it is desired to bring its connecting portion into engagement with the legs of a large animal or an animal having long legs, it being understood that the lever, in this latter instance, has less latitude of movement and also that the connecting portion of the yoke is positioned a considerable distance above the floor of the pen.

What is claimed is—

1. A pen for holding swine, including a front wall and having an opening through its said wall for the passage of the snout of an animal, a throat board within the pen against which the throat of the animal is designed to rest, and means for engagement with the legs of the animal to hold him against movement.

2. A pen for holding swine, including a front wall and having an opening through its said wall for the passage of the snout of an animal, a concaved throat board within the pen against which the throat of the animal is designed to rest, and means for engagement with the legs of the animal to hold him against movement.

3. A pen for holding swine, including a front wall and having an opening through its said wall for the passage of the snout of an animal, a throat board within the pen against which the throat of the animal is designed to rest, and means for engagement with the legs of the animal to hold him against movement, said means being adjustable to suit swine of various sizes.

4. A pen for holding swine, including side walls and a front wall and having an opening through the front wall for the passage of the snout of the animal, the side walls of the pen being slotted, a holding yoke including a connecting portion engaged in the slots, and means for varying the position of the yoke and for holding the same at various adjustments.

5. A pen for holding swine, including side walls and a front wall and having an opening through the front wall for the passage of the snout of the animal, the side walls of the pen being slotted, a holding yoke including a connecting portion engaged in the slots, and a lever for varying the position of the yoke and for holding the same at various adjustments.

6. A pen for holding swine, including side walls and a front wall and having an opening through the front wall for the passage of the snout of the animal, the side walls of the pen being provided with pairs of slots, a holding yoke including a connecting portion engaged in the slots, and means for varying the position of the yoke and for holding the same at various adjustments.

In testimony whereof, I affix my signature, in presence of two witnesses.

JOHN C. MABBOTT.

Witnesses:
J. G. TROTTER,
E. L. BRIDGE.